United States Patent [19]
Hannah

[11] Patent Number: 4,564,201
[45] Date of Patent: Jan. 14, 1986

[54] METHOD AND APPARATUS FOR SEALING A DISCONTINUITY IN A TUBULAR ASSEMBLY

[75] Inventor: Joseph R. Hannah, Reddish, England

[73] Assignee: Mavie Limited, Cheshire, England

[21] Appl. No.: 520,854

[22] Filed: Aug. 5, 1983

[30] Foreign Application Priority Data

Aug. 5, 1982 [GB] United Kingdom ............... 8222616

[51] Int. Cl.$^4$ ............................................. F16J 15/02
[52] U.S. Cl. ......................................... 277/1; 277/9; 277/128; 285/373; 285/398
[58] Field of Search ................. 277/1, 9, 128, 151, 277/189; 285/321, 370, 371, 373, 397, 398; 138/97, 98

[56] References Cited

U.S. PATENT DOCUMENTS

| | | | |
|---|---|---|---|
| 509,458 | 11/1893 | Still | 285/398 X |
| 3,199,899 | 8/1965 | Fujii | 285/373 X |
| 3,521,913 | 7/1970 | Verhein et al. | 285/398 X |
| 3,960,395 | 6/1976 | Cirule et al. | 285/39 X |

*Primary Examiner*—Robert S. Ward
*Attorney, Agent, or Firm*—Pravel, Gambrell, Hewitt & Kimball

[57] ABSTRACT

A method of forming a seal over at a discontinuity in a tubular area e.g. a joint between two pipes comprises providing a sealing element around the area and clamping the element in position with a clamping element extending around the sealing element. The clamping element has portions with interengaging formations (e.g. teeth) adapted to allow relative movement between said two portions to apply clamping pressure to the element but to prevent relative movement in the other direction.

14 Claims, 4 Drawing Figures

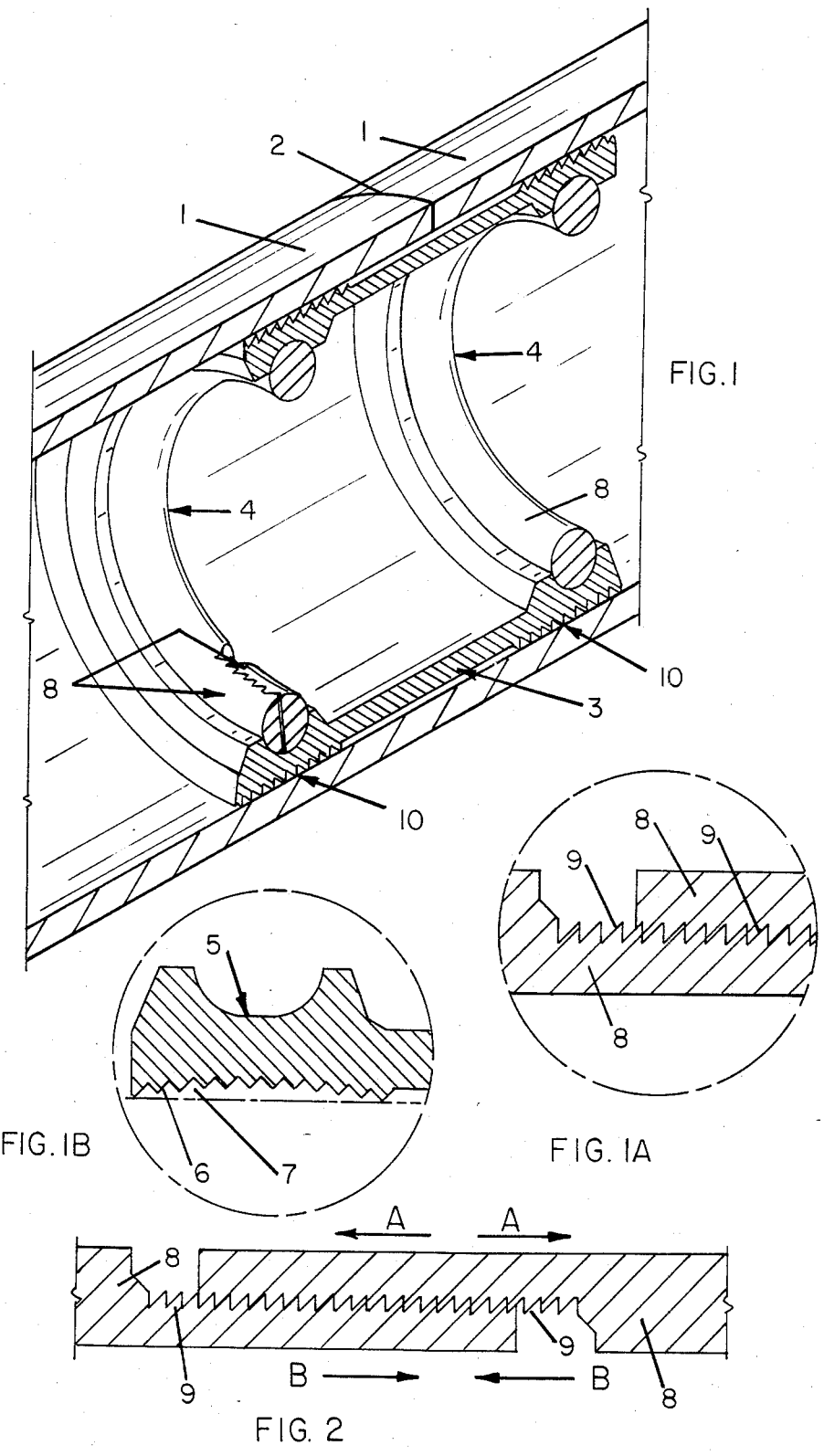

METHOD AND APPARATUS FOR SEALING A DISCONTINUITY IN A TUBULAR ASSEMBLY

The present invention relates to seals, and particularly but not exclusively to seals provided at a joint between two pipes.

According to the present invention there is provided a method of forming a seal over at a discontinuity in a tubular area comprising providing a sealing element around the area and clamping the element in position with a clamping element extending around the sealing element and having portions with interengaging formations adapted to allow relative movement between said two portions to apply clamping pressure to the element but to prevent relative movement in the other direction.

Preferably two clamping elements are provided and are located one at each side of the discontinuity.

To clamp a sealing element within a tubular area, the clamp assembly is such that it may initially be of lesser diameter than the seal and then expanded (i.e. increased in diameter) so that the interengaging formations move one relative to the other to allow expansion. The clamp assembly cannot however 'contract' because the interengaging formations prevent such movement. To clamp a seal against the outside of a pipe, the clamp assembly is formed such that the interengaging formations allow the opposite series of movement i.e. contraction but not expansion.

The interengaging formations are preferably teeth cut to allow movement as described above.

The clamping element may be formed in two or more sections with each section being joined by interengaging projections as described above. In this case, the element may be moved to its clamping position progressively by effecting relative movement at each joint in turn.

Preferably the clamping element is preformed to the approximate cross sectional shape of the tubular area to be sealed.

The sealing element is preferably of an elastomeric material and preferably comprises, on one side thereof, a clamp receiving channel and on the other side thereof opposite said channel a set of projections (preferably narrowing in width in a direction away from the channel) and provided over substantially the length of said channel. The projections are preferably triangular in section and extend substantially parallel to the channel. Furthermore the element preferably comprises two clamp receiving channels (preferably provided one sustantially along each edge of the element), with a set of projections being located opposite each channel.

The method of the invention is particularly useful for the sealing of a joint between two pipes, particularly gas main pipes. The invention may however also be used for sealing a break, crack or other defect in a cylindrical or oval vessel.

The invention will be further described by way of example only with reference to the accompanying drawings, in which FIG. 1 is a perspective cut away view showing an internal seal for a pipe; and FIG. 1A is an exploded view in cross-section;

FIG. 1B is an exploded view in cross-section;

FIG. 2 is an expanded view of the teeth of the clamping element shown in FIG. 1.

FIG. 1 illustrates two high pressure gas pipes 1 with a joint 2 (illustrates for the purpose of simplicity as a butt joint although it will be appreciated that in practice the joint will be of the type normally employed for such pipes.)

A seal is formed at the joint 2 by a sleeve 3 of elastomeric material (e.g. nitrile rubber) and two circular clamp assemblies 4. Sleeve 3 is initially formed as a flat extrusion but, in use, is bent round to the circular shape illustrated in FIG. 1.

Sleeve 3 includes, on one side thereof two semi-circular channels 5 and, on the opposite side thereof, two sets of projections 6 and intermediate recesses 7. Each such set of projections 6 and recesses 7 is provided opposite one of the channels 5, as illustrated. The tips of the projections 6 lie on a shallow curve which has its closest approach to the channel 5 at the base thereof.

Each clamp assembly 4 comprises a rod 8 preformed into a circle and having teeth 9 formed at its ends. The teeth 9 are cut as shown in FIG. 2 such that movement of the rod ends away from each other as designated by the arrows A is permitted whereas movement of the rod ends toward each other (arrows B) is not possible. It will thus be appreciated that each clamp assembly 4 may be expanded in diameter by a suitable tool (not shown). Only low pressure is required to expand the clamps.

To form the seal at the joint 2, an elastomeric adhesive 10 may optionally be applied to the pipes 1 and/or sleeve 3 such that, with the sleeve 3 located in position, the adhesive 10 fills the recesses 7. The adhesive 10 may be one which will subsequently cure so as to provide a complete, elastomeric, bond between the sleeve 3 and pipes 1.

Each circular rod 8 is seated in a channel 5 such that the toothed joints on the rods will be angularly spaced from each other (preferably by 180°). This will ensure that the radial force generated at the joints after the rods 8 apply a clamping force is distributed around the sleeve 3.

The rods 8 are now expanded in the manner which will be appreciated from the foregoing description. As a result of the clamping force generated, the sleeve 3 is held tightly against the inside of pipes 1. Owing to the fact that the tips of projections 6 are located on a curve, the projections will be applied with equal pressure against the pipe 1. The projections are pressed against the inner wall of the pipes such that they are to a certain extent flattened thereby improving the seal. A gas tight seal is therefore ensured.

It will thus be appreciated that the illustrated arrangement provides a simple and effective seal for a gas pipe.

A number of modifications may be made to the illustrated embodiment. For example, each clamp assembly 4 may comprise more than two toothed rods as mentioned previously. Further, a clamp may be applied over each toothed joint to provide closing pressure on the joint. Additionally, a spacer or clamp may be provided to hold the clamp assemblies 4 in precise axially spaced relationship. Finally, the sleeve 3 may be formed with more than two channels 5 so that more than two clamp assemblies 4 may be employed.

What is claimed is:

1. A method of sealing a discontinuity in a tubular assembly, comprising:

providing over the discontinuity on the interior surface of the tubular assembly a sealing element;

providing radially expensive clamping rings, one on each side of the discontinuity for expansion against the inner surface of the sealing element, wherein each of said clamping means includes adjacent end portions, each end portion including teeth formations which mesh with the teeth formations on the other end portion, said teeth formations being defined by ridges and valleys which extend radially inward of the clamping ring and said teeth being formed such that they allow movement of the end portions away from each other to provide for said radial expansion but prevent movement of the end portions towards each other so that once expanded, the clamping ring remains in its expanded position; and expanding each of the clamping rings so as to clamp the outer surface of the sealing element against the tubular assembly.

2. The method of claim 1, wherein the inner surface of the sealing element includes two clamp ring receiving channels located one on each of side of the discontinuity for retaining the clamp rings in position on opposite sides of the discontinuity.

3. The method of claim 1 wherein the outer surface of the sealing element includes projections overlying the receiving channels for compression against the inner surface of the tubular assembly when said clamping rings are expanded against said channels.

4. The method of claim 3 wherein the projections extend parallel to the channels.

5. The method of claim 4 wherein the projections decrease in width in a direction away from the channel.

6. The method of claim 3 further comprising:
applying an adhesive over a portion of the outer surface of said sealing element having said projections thereon before providing said sealing element over the discontinuity.

7. The method of claim 1 wherein the discontinuity is a joint between two pipes.

8. An apparatus for sealing a discontinuity in a tubular assembly from the inside of the assembly, comprising:
a sealing element;
at least two radially expansive clamping rings, each of said clamping means including end portions, wherein
each of said end portions includes teeth formations for meshing with teeth formations on the other end portion, and wherein
said teeth formations include ridges and valleys which extend radially inward of the clamping ring, and wherein
said teeth formations are formed such that they allow movement of the end portions away from each other to provide for radial expansion of said clamping rings but prevent movement of the end portions towards each other to retain said clamping rings in an expanded position.

9. The apparatus of claim 8, further comprising:
at least two clamp ring receiving channels within the inner surface of the sealing element, one on each of side of the discontinuity, for retaining the clamp rings in position on opposite sides of the discontinuity.

10. The apparatus of claim 8, further comprising:
projections on the outer surface of the sealing element overlying the receiving channels for compression against the inner surface of the tubular assembly when said clamping rings are expanded against said channels.

11. The apparatus of claim 10, wherein the projections extend parallel to the channels.

12. The apparatus of claim 11 wherein the projections decrease in width in a direction away from the channel.

13. The apparatus of claim 10, further comprising:
an adhesive between said projections on the outer surface of said sealing element and the inner surface of the tubular assembly.

14. The apparatus of claim 13 wherein the discontinuity is a joint between two pipes.

* * * * *